(12) United States Patent
Pandya et al.

(10) Patent No.: US 8,843,531 B2
(45) Date of Patent: Sep. 23, 2014

(54) BOOKKEEPING OF DOWNLOAD TIMESTAMPS

(75) Inventors: Hemal Pandya, Pune (IN); Jitendra Kumar Singh, Uttar Pradesh (IN); Christopher Redvers Jobson, Maidenhead (GB)

(73) Assignee: Sybase, Inc., Dublin, CA (US)

( * ) Notice: Subject to any disclaimer, the term of this patent is extended or adjusted under 35 U.S.C. 154(b) by 13 days.

(21) Appl. No.: 12/624,586

(22) Filed: Nov. 24, 2009

(65) Prior Publication Data

US 2011/0125709 A1     May 26, 2011

(51) Int. Cl.
*G06F 17/30*     (2006.01)

(52) U.S. Cl.
CPC ................................ *G06F 17/30575* (2013.01)
USPC ........... 707/813; 707/821; 707/790; 707/687; 707/609; 707/608

(58) Field of Classification Search
USPC .................. 707/608, 609, 687, 790, 813, 821
See application file for complete search history.

(56) References Cited

U.S. PATENT DOCUMENTS 7,240,364 B1 *    7/2007   Branscomb et al. .............. 726/9
8,195,606 B2 *    6/2012   Lu et al. ........................ 707/610

* cited by examiner

*Primary Examiner* — Sana Al Hashemi
(74) *Attorney, Agent, or Firm* — Sterne Kessler Goldstein & Fox P.L.L.C.

(57) ABSTRACT

Systems, methods and computer program products for bookkeeping of download stamps are described herein. An embodiment includes augmenting database table (or mobile business object) metadata with a synchronization ("sync") key and assigning a unique identifier to each sync key. A sync key is assigned to one or more rows (or records) in the database table and a download timestamp is associated with each sync key. The embodiment further includes identifying a sync key associated with each row in the database table. Links between rows occurring in different database tables are maintained using sync keys. In this way, embodiments of the invention allow a server to record a download timestamp of database table subsets, where such subsets may include one or more rows in the database tables. This allows data to be downloaded by a client at subset granularity.

20 Claims, 8 Drawing Sheets

TASK_PART

| Task Id | Part Id |
|---|---|
| 951 | Q3373 |
| 952 | D620 |

PART

| Part Id | Description |
|---|---|
| D620 | Dell D620 |
| Q3373 | Q3373 |

TASK

| Task Id | Description | Engineer | Customer |
|---|---|---|---|
| 951 | Cannot browse | 3293 | 6165 |
| 952 | Beep on boot | 3293 | 7493 |

MANUAL

| Part Id | Content |
|---|---|
| D620 | abababab |
| Q3373 | pqpqpqp |

CUSTOMER

| Cust Id | Name | Address | Zip |
|---|---|---|---|
| 6165 | User Lost | llp | 94501 |
| 7493 | Beep Beep | sda | 98765 |

MAP

| zip code | Image |
|---|---|
| 94501 | xxxxxxxxxxxxxxxx |
| 98765 | ||||||||||||||||| |

FIG. 2B

BOOKKEEPING OF DOWNLOAD TIMESTAMPS

BACKGROUND

1. Field of the Invention

The present invention relates to timestamps, and more particularly towards bookkeeping of download timestamps.

2. Background Art

A timestamp is a sequence of characters, denoting a date and time at which a certain event occurred. Timestamps are usually presented in a consistent format, allowing for easy comparison of timestamp records. The practice of recording timestamps in a consistent manner along with associated data is called time-stamping.

Timestamps are typically used for logging events, in which case each event in a log is marked with a timestamp. For example, in file-systems, a timestamp may denote a date/time of creation or modification of a file.

In some client-server environments, clients provide a last-download timestamp of data to a server. This allows the server to send data modified since the last download timestamp. However, using conventional technology, clients are unable to provide a last download timestamp of database table subsets to a server. Therefore, the server is unable to provide data to the clients at a subset granularity.

Accordingly, systems, methods and computer program products are needed that allow a server to record download timestamps of database table subsets allowing data to be downloaded by a client at subset granularity.

BRIEF SUMMARY

Briefly stated, the invention includes system, method, computer program product embodiments and combinations and sub-combinations thereof for bookkeeping of download timestamps.

An embodiment includes augmenting a database table (or database metadata) with a synchronization ("sync") key and assigning a unique identifier to each sync key. A sync key is assigned to one or more rows (or records) in the database table and a download timestamp (e.g. a last download timestamp) is recorded for each sync key. Links between related rows occurring in different database tables are maintained using sync keys.

In this way, because a download timestamp is associated with each sync key and each sync key is further associated with one or more rows in the database tables, embodiments of the invention allow a server to record a download timestamp of a database table subset, where such a subset includes one or more rows in the database tables. This allows data to be downloaded from the server at subset granularity. Furthermore, embodiments of the invention also allow cascade synchronization of related database table subsets during a single synchronization session between a client and the server.

Further embodiments, features, and advantages of the invention, as well as the structure and operation of the various embodiments of the invention are, described in detail below with reference to accompanying drawings.

BRIEF DESCRIPTION OF THE DRAWINGS

The accompanying drawings, which are incorporated herein and form a part of the specification, illustrate embodiments of the present invention and, together with the description, further serve to explain the principles of the invention and to enable a person skilled in the relevant art to make and use the invention.

FIG. 2B illustrates the exemplary tables from FIG. 2A after selective updates, according to an embodiment.

Figure 1:
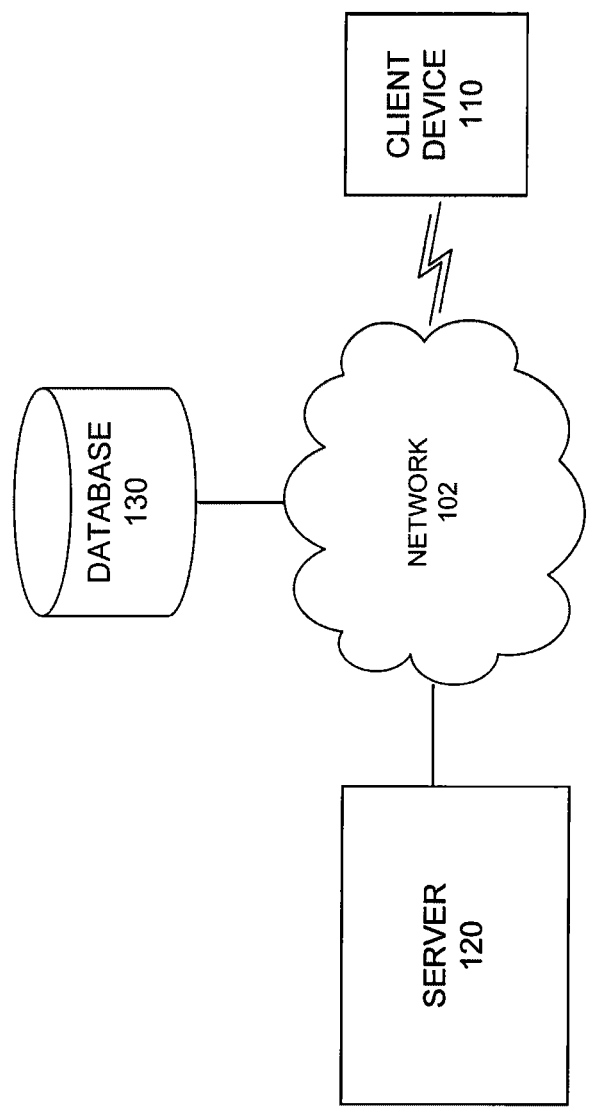
FIG. 1 is an example network architecture in which embodiments of the present invention, or portions thereof, are implemented.

The features and advantages of the present invention will become more apparent from the detailed description set forth below when taken in conjunction with the drawings. In the drawings, like reference numbers generally indicate identical, functionally similar, and/or structurally similar elements. Generally, the drawing in which an element first appears is indicated by the leftmost digit(s) in the corresponding reference number.

DETAILED DESCRIPTION

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

System

FIG. 1 is an example network architecture in which embodiments of the present invention, or portions thereof, are implemented. (While the following is described in terms of client-server environments and mobile clients, the invention is not limited to this embodiment. The invention is applicable to any system having generally the structure of FIG. 1, or that would benefit from the function as described herein. Furthermore, embodiments of the invention are not limited to last download timestamps and apply equally to other forms of timestamps.)

FIG. 1 illustrates system 100 that includes network 102, client device 110, server 120 and database 130.

In an embodiment, client device 110 includes one of many devices commonly designated as mobile clients, such as, but not limited to, personal digital assistants ("PDAs"), devices operating according to the Microsoft Pocket PC specification with the Microsoft Windows® CE operating system (OS), devices running the Symbian OS, devices running the Palm OS®, mobile phones, BlackBerry® devices, smart phones, hand held computers, palmtop computers, laptop computers, ultra-mobile PCs, and other wireless mobile devices capable of running mobile applications. Client device 110 can allow a user to manipulate data on client device 110 which can be synchronized with server 120. In an embodiment, client device 110 may be 'online' or connected to server 120. In another embodiment, client device 110 can be 'offline' or not connected to server 120. In yet another embodiment, client device 110 can be intermittently connected to server 120.

In an embodiment, client device 110 includes, but is not limited to, a device having one or more processors and memory for executing and storing instructions. Such a client device may include software, firmware, and hardware or some combination thereof. The software may include one or more applications and an operating system. The hardware can include, but is not limited to, one or more processors, memory and user interface display. In an embodiment, client device 110 includes a client application that receives and displays data from server 120.

Although FIG. 1 illustrates a single client device 110 for clarity, it is to be appreciated that system 100 is scalable and a plurality of client devices can connect to server 120 via network 102.

In an embodiment, network 102 includes one or more networks, including but not limited to, a local area network, medium-area network, and/or wide-area network, such as, the Internet. Network 102, for example, can be a wired or wireless network that allows client device 110, server 120, and database 130 to communicate with each other. Network 102 can further support world-wide web protocols and services.

In an embodiment, server 120 synchronizes data stored on server 120 with client device 110. Client device 110 may receive the most current data available on server 120 via network 102. Client device 110 may upload its most current data to server 120 for any given application or set of applications. As a purely illustrative example, a user of client device 110 may have added, deleted, or made changes to appointments (or any other data or database) within client device 110 itself. Upon synchronization, server 120 learns of the appointments made, changed, or deleted on client device 110, and client device 110 learns of appointments made, changed, or deleted on server 120. In another embodiment, server 120 may retrieve data from database 130 and provide the retrieved data to client device 110 over network 102.

In an embodiment, server 120 can include, but is not limited to, a device having one or more processors and memory for executing and storing instructions. Such a server can include software, firmware, and hardware or some combination thereof. The software may include one or more applications and an operating system. The hardware can include, but is not limited to, one or more processors, memory and user interface display.

Server 120 is associated with database 130 that can store a plurality of database tables or mobile business objects (MBOs). As a purely illustrative example, not intended to limit the invention, an MBO is a representation of a subset of data contained in database 130 or server 120. An example MBO is described in further detail in U.S. patent application Ser. No. 12/503,573 entitled "Metadata Driven Mobile Business Objects," which is incorporated by reference herein in its entirety. A database table (or a MBO) can include a plurality of rows. Database 130 may be located within server 120, in other servers independent from server 120 or even exist as an independent database (as shown in FIG. 1). In accordance with an embodiment, data stored in database 130 may also be synchronized with local data stores, databases or a cache residing on server 120. "Data" as used herein may be any object or data, including, but not limited to, information in any form (text, video, audio, etc.) and applications. In an embodiment, server 120 can include a cache (not shown) that stores database tables or MBOs (such as those illustrated in FIG. 2A) retrieved from database 130. Database tables or database table subsets retrieved by server 120 from database 130 can be synchronized by server 120 with client device 110.

Figure 2A:
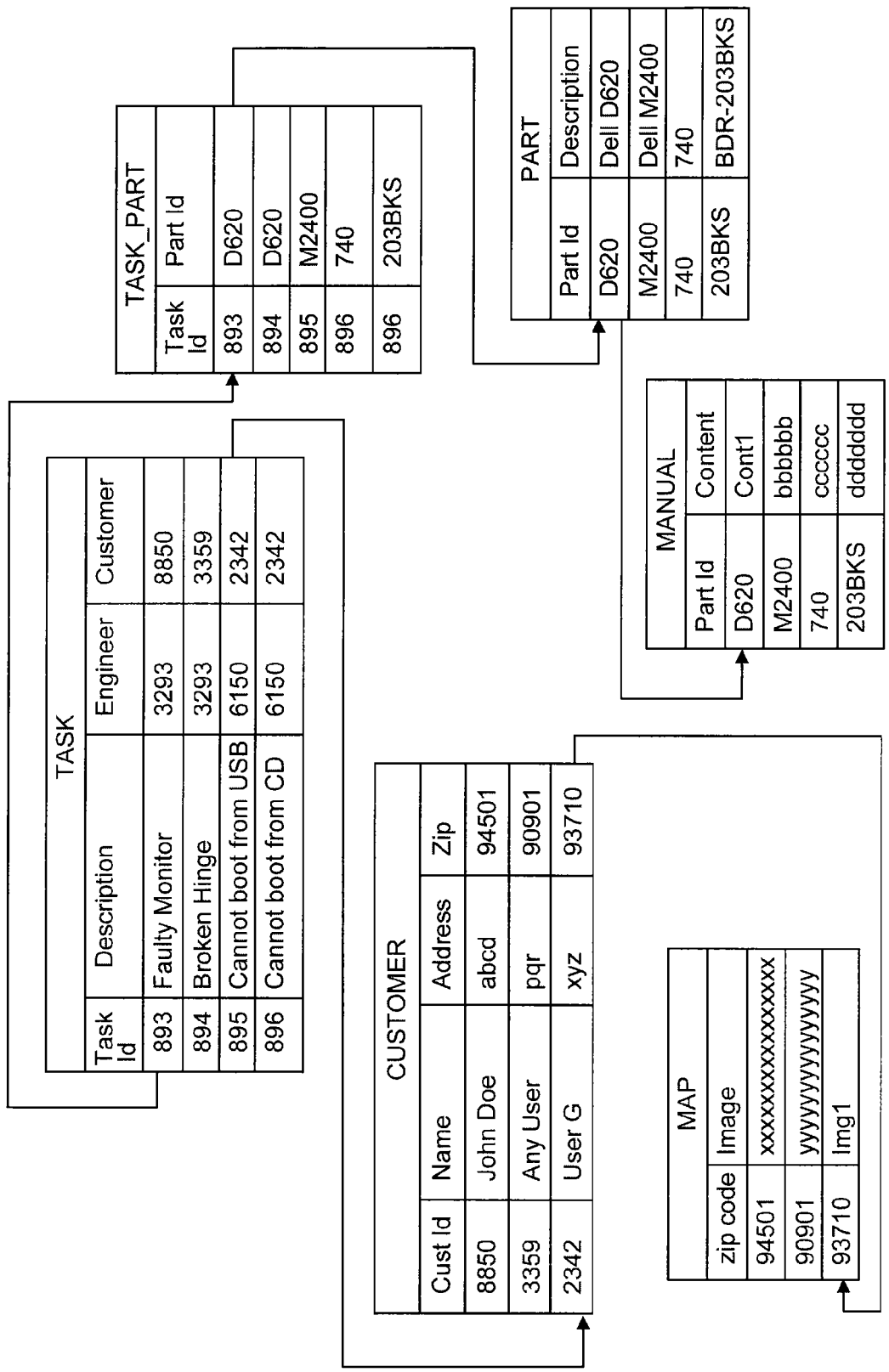
FIG. 2A illustrates exemplary tables that are downloaded from a database, according to an embodiment.

FIG. 2A illustrates exemplary database tables or MBOs that can be stored in database 130, according to an embodiment. The plurality of database tables illustrated in FIG. 2A include Task, Task_Part, Customer, Map, Manual and Part. The arrows shown in FIG. 2A indicate that relationships exist between rows in different tables. For example, the task ID '893' in table 'Task' is associated with Part ID 'D620' in table 'Task_Part'. Therefore, these rows in tables 'Task' and 'Task_Part' are related. In other words, relationships are indicated by common IDs (e.g. common Task IDs, Part IDs, zip, etc.) shared across database tables. Any IDs in database tables can be used to indicate such relationships. When rows in different database tables are related, it may be more efficient to transfer them together (as a database table subset) during a single synchronization operation between server 120 and client device 110. A synchronization operation that synchronizes all related rows in database tables, in one synchronization operation, may be termed as a 'cascade' synchronization operation.

FIG. 2B illustrates exemplary tables from FIG. 2A after selective updates have been performed on the tables by server 120 or client device 110. For example, in table 'Task', task IDs 893 and 894 have been deleted and task IDs 951 and 952 have been added. In a similar manner, other updates have been made to Customer, Map, Part and Manual Tables. As shown in FIG. 2B, it is apparent that only specific rows of database tables Task, Task_Part, Customer, Map, Part and Manual have been updated. In other words, in FIG. 2B, only subsets of the database tables and not the entirety of the database tables have been updated. Therefore, in a future (post update) synchronization session, only those rows (or database table subsets) that have been updated need to be synchronized with server 120.

Providing a last-download timestamp of an entire database publication that includes one or more database tables can be disadvantageous as data can only be updated or synchronized at a 'publication' level that includes one or more entire database tables. Synchronizing a publication of multiple database tables or an entire database table is inefficient when only a subset of database table data (e.g. one or more rows) is modified.

Embodiments of the invention include augmenting database tables (or database metadata) with synchronization ("sync") keys and assigning a unique identifier to each sync key. A sync key is assigned to one or more rows (or records) in the database table and a download timestamp is recorded for each sync key. Links between related rows occurring in different database tables are maintained using sync keys.

In this way, because a download timestamp is associated with each sync key and each sync key is further associated with one or more rows in the database tables, embodiments of the invention allow server 120 to record a download timestamp (e.g. a last download timestamp) of a database table subset, where such a subset includes one or more rows in the database tables. This allows data to be downloaded from server 120 at subset granularity. Furthermore, embodiments of the invention also allow cascade synchronization of related database table subsets during a single synchronization session between client device 110 and server 120.

Figure 3A:
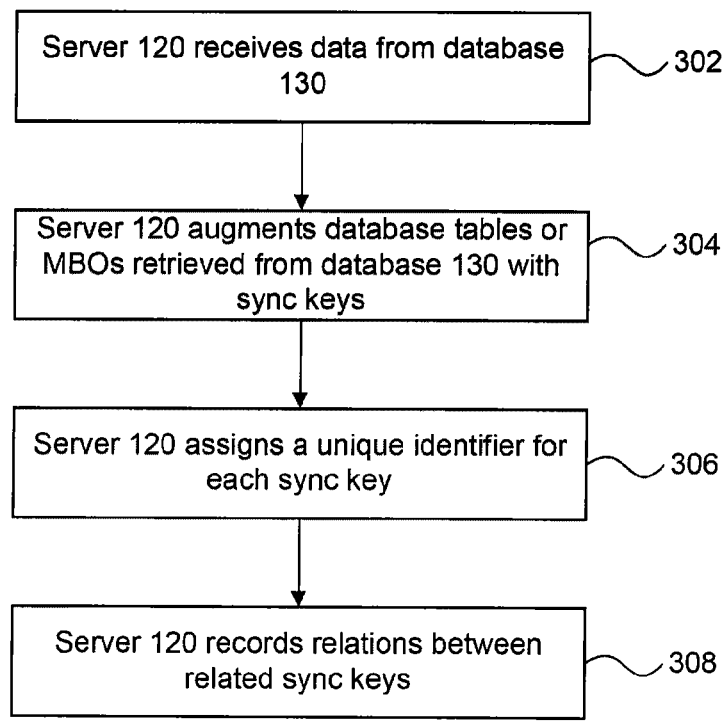
FIG. 3A is a flowchart illustrating an exemplary operation of a server to augment database tables with sync keys, according to an embodiment.

FIG. 3A is an exemplary flowchart 300 illustrating an operation of server 120 to augment a database tables with sync keys, according to an embodiment.

In step 302, server 120 receives data from database 130. As an example, server 130 may receive data during a synchronization session with database 130. As described earlier, server 120 can include a cache that stores database tables or MBOs (such as those illustrated in FIG. 2A) retrieved from database 130.

In step 304, server 120 adds sync keys to database tables or MBOs retrieved from database 130. For example, referring to FIG. 2A a sync key of 'Engineer' is added to table 'Task' and another sync key of 'Part ID' is added to table 'Part' and table 'Manual'. Also, a sync key of 'Task ID' is added by server 120 to table 'Task_Part' and a sync key of 'Cust ID' is added to table 'Customer'. In addition, a sync key of 'Zip Code' is added by server 120 to table 'Map'.

In step 306, server 120 assigns a unique sync key identifier (e.g. number) to each sync key in each MBO or database table retrieved from database 130. As a purely illustrative example, not intended to limit the invention, an unique sync key identifier of '42' can be assigned to table 'Task' and sync key "engineer=3293". This can be represented as '42 for Task: {engineer=3293}'. In a similar manner, another unique sync key identifier can be '671 for Part: {Part_id=D620}'. Table 1 illustrates exemplary unique sync key identifiers associated with sync keys and stored by server 120, according to an embodiment.

TABLE 1

| Sync Key Identifier | Table/Sync Key Combination |
|---|---|
| 42 | Task:{engineer=3293} |
| 671 | Part:{Part_Id = D620} |
| ... | ... |

In step 308, server 120 records relations between related sync keys. For example, referring to FIG. 2A, server 120 records that a relation exists between task ID '893' in table 'Task' and Part ID 'D620' in the table 'Task_Part'. As discussed above, relationships are indicated by common IDs (e.g. common Task IDs) shared across database tables. Accordingly, in an embodiment, step 308 requires no additional action on the part of server 120, because the relations between related sync keys are established by matching IDs.

In this way, server 120 augments database tables (or MBOs) received from database 130 with sync keys and records relationships between related sync keys. In an embodiment, once the database tables are augmented with sync keys, server 120 maintains a download time stamp for each sync key. As discussed above, because a download timestamp is associated with each sync key and each sync key is further associated with one or more rows in the database tables, embodiments of the invention allow server 120 to record a last-download timestamp of a database table subset, where such a subset includes one or more rows in the database tables. This allows data to be downloaded by client device 110, from server 120, at subset granularity.

Figure 3B:
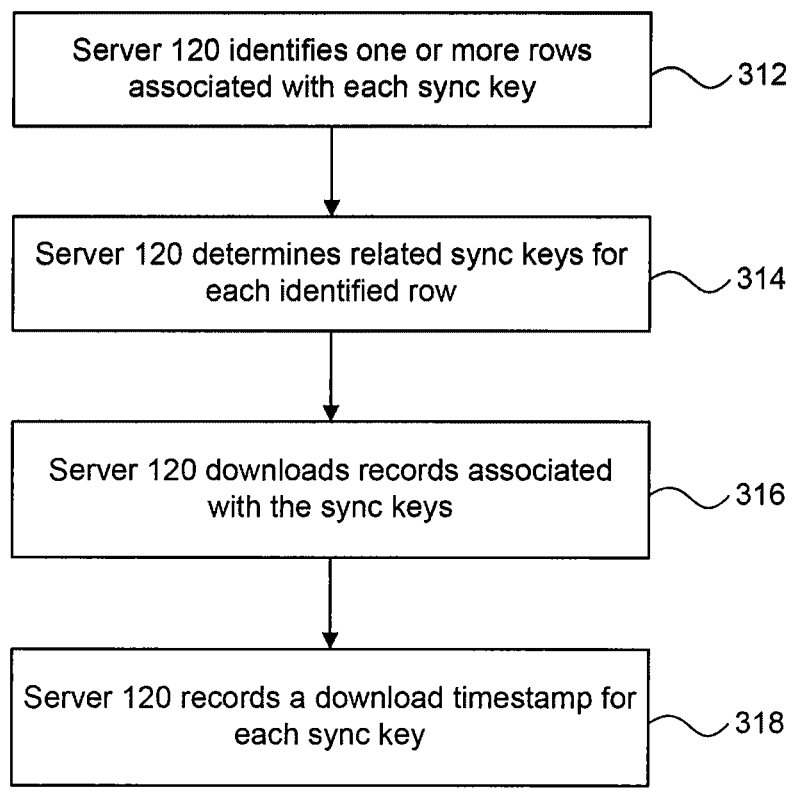
FIG. 3B is a flowchart illustrating an exemplary operation of a server to maintain a download timestamp for each sync key, according to an embodiment.

FIG. 3B illustrates an exemplary flowchart 310 illustrating an operation of server 120 to record and maintain a download timestamp for each sync key, according to an embodiment.

In step 312, server 120 identifies one or more rows associated with each sync key. As an example, server 120 may review the data recorded in step 306 of flowchart 300 discussed above. Thus, referring to exemplary Table 1, to identify row(s) associated with each sync key, server 120 can review the entries '42 for Task: {engineer=3293}' and '671 for Part: {Part_Id=D620}.

In step 314, server 120 determines related sync keys, for each row identified in step 312, using common identifiers (e.g. Task IDs) shared across database tables. As an example, to determine related sync keys, server 120 reviews the information recorded in step 308 of flowchart 300. Thus, server 120 determines that a relation exists between task ID '893' in table 'Task' and Part ID 'D620' in the table 'Task_Part'. In a similar manner, server 120 also determines that a relationship exists between Part ID 'D620' in table 'Task_Part' and Description 'DellD620' in table 'Part' and Content 'Cont1' in table 'Manual'. Furthermore, server 120 also determines that Customer '2342' in table 'Task' is related to Customer 'User G' in table 'Customer'. Similarly, Zip '93710' in table 'Customer' is related to Image 'Img 1' in table 'Map'. As discussed above, relationships are indicated by common IDs (e.g. common Task IDs) shared across database tables.

In an embodiment, not intended to limit the invention, steps 312 and 314 are performed recursively. For example, once related sync keys are identified in step 314, the server 120 identifies rows in the related sync keys (step 312) and determines the related sync keys for the identified rows (step 314). In this way, for example, steps 312 and 314 may be performed recursively till all related sync keys have been determined in step 314.

In step 316, server 120 downloads records (e.g. from database 130) associated with the sync keys determined in step 314.

In step 318, server 120 records a download timestamp for each sync key. Such a download timestamp may be recorded whenever client device 110 downloads data from a server 120. As an example, a last download timestamp for each sync key may be stored in server 120 or in a cache in server 120.

In this way, using exemplary methods 300 and 310, server 120 augments database tables with sync keys and maintains a download timestamp for each sync key. An exemplary method of synchronizing data between server 120 and client device 110 using sync keys is described below.

Figure 4A:
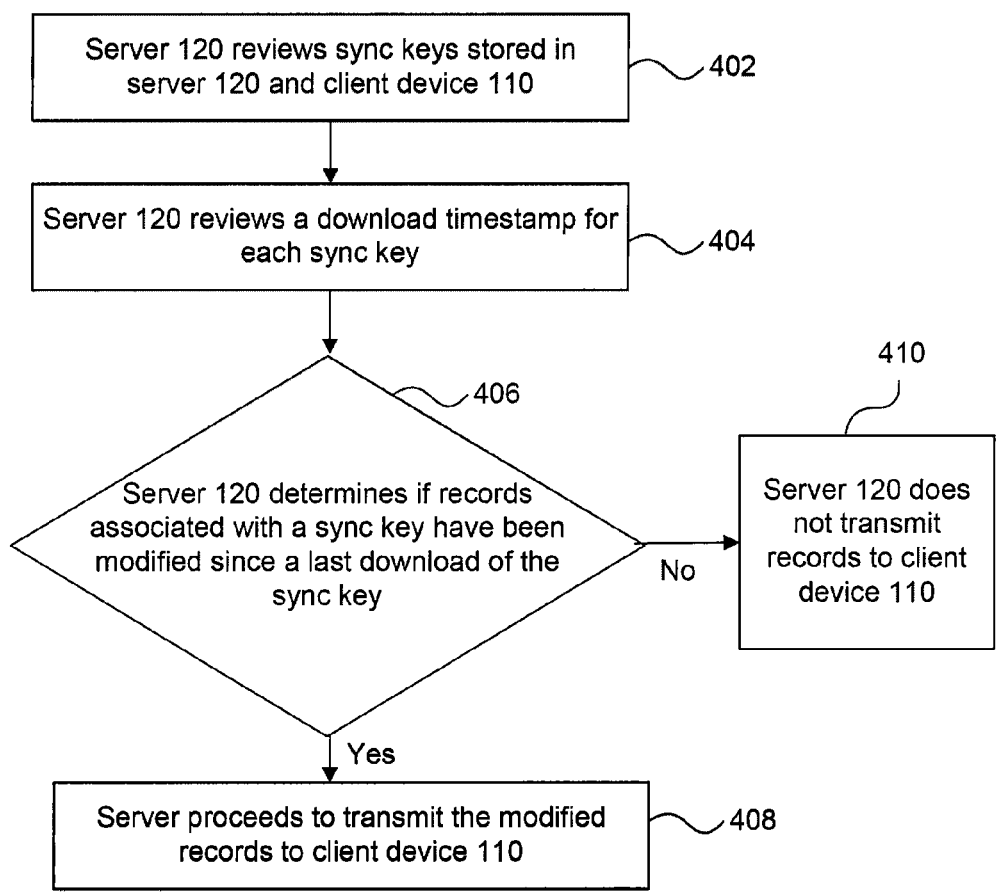
FIG. 4A is a flowchart illustrating an exemplary synchronization operation between a server and a client, according to an embodiment.

FIG. 4A is a flowchart 400 that illustrates an exemplary synchronization operation between server 120 and client device 110, according to an embodiment.

In step 402, server 120 reviews sync keys stored in server 120 and client device 110 to synchronize the sync keys between server 120 and client device 110. For example, during review, if server 120 determines that a sync key is located in server 120 but is absent from client device 110, server 120 determines that the sync key has been deleted from the client 110 since the last synchronization operation. Furthermore, if a sync key is present in the client device 110 but absent from server 120, server 120 considers the sync key to be a new sync key that was added at client 110 since the last synchronization operation.

In step 404, server 120 reviews a download timestamp (e.g. a last download timestamp) for each sync key received from client device 110. As described above in step 316, once the database tables are augmented with sync keys, server 120 maintains a download time stamp for each sync key. As an example, a last download timestamp for each sync key is stored in server 120 or in a cache in server 120.

In step 406, server 120 determines if records associated with a sync key have been modified (e.g. one or more rows of a database table or MBO) at database 130 after the last download timestamp identified in step 404. For example, not intended to limit the invention, server 120 may check a last modified timestamp associated with each record to determine if a record has been modified. If one or more records have been modified after the last download timestamp identified in step 404 (step 406), server 120 proceeds to transmit the modified records (which includes the cascaded rows associated with the sync key) to client device 110 (step 408). Returning to step 406, if one or more records have not been modified after the last download timestamp identified in step 404, server 120 does not transmit the records (which includes one or more cascaded rows) to client device 110 (step 410).

Figure 4B:
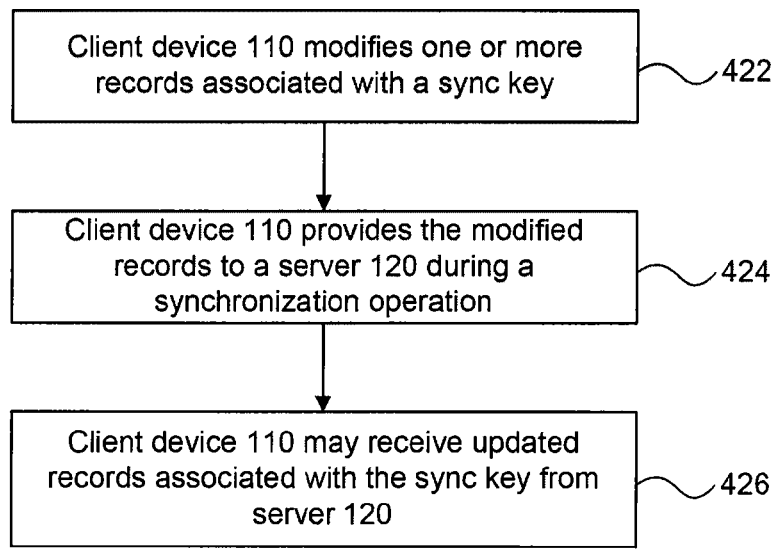
FIG. 4B is a flowchart illustrating an exemplary operation of a client device, according to an embodiment.

FIG. 4B is a flowchart 420 that illustrates an exemplary operation of a client device 110, according to an embodiment.

In step 422, client device 110 modifies one or more records associated with a sync key on client device 110.

In step 424, client device 110 provides the modified records (which includes the cascaded rows associated with the sync key) to server 120 during a synchronization operation with server 120. As an example, a modified record may be provided to server 120 during the synchronization operation illustrated in flowchart 400.

In step 426, client device 110 may receive updated records, associated with the sync key, from server 120. As an example, referring to step 406 of flowchart 400, if any records have been modified after the last download timestamp identified in step 404, client device 110 receives the modified records (which includes the rows associated with the sync key) from server 120. However, if any records have not been updated after the last download timestamp identified in step 404, client device 110 does not receive records from server 120.

In this way, because a download timestamp is associated with each sync key and each sync key is further associated with one or more rows in the database tables, embodiments of the invention allow a server to record a last-download timestamp of a database table subset, where such a subset includes one or more rows in the database tables. This allows data to be downloaded by a client at subset granularity. Furthermore, embodiments of the invention also allow cascade synchronization of related database table subsets during a single synchronization session between the client and the server.

Example Computer Embodiment

Figure 5:
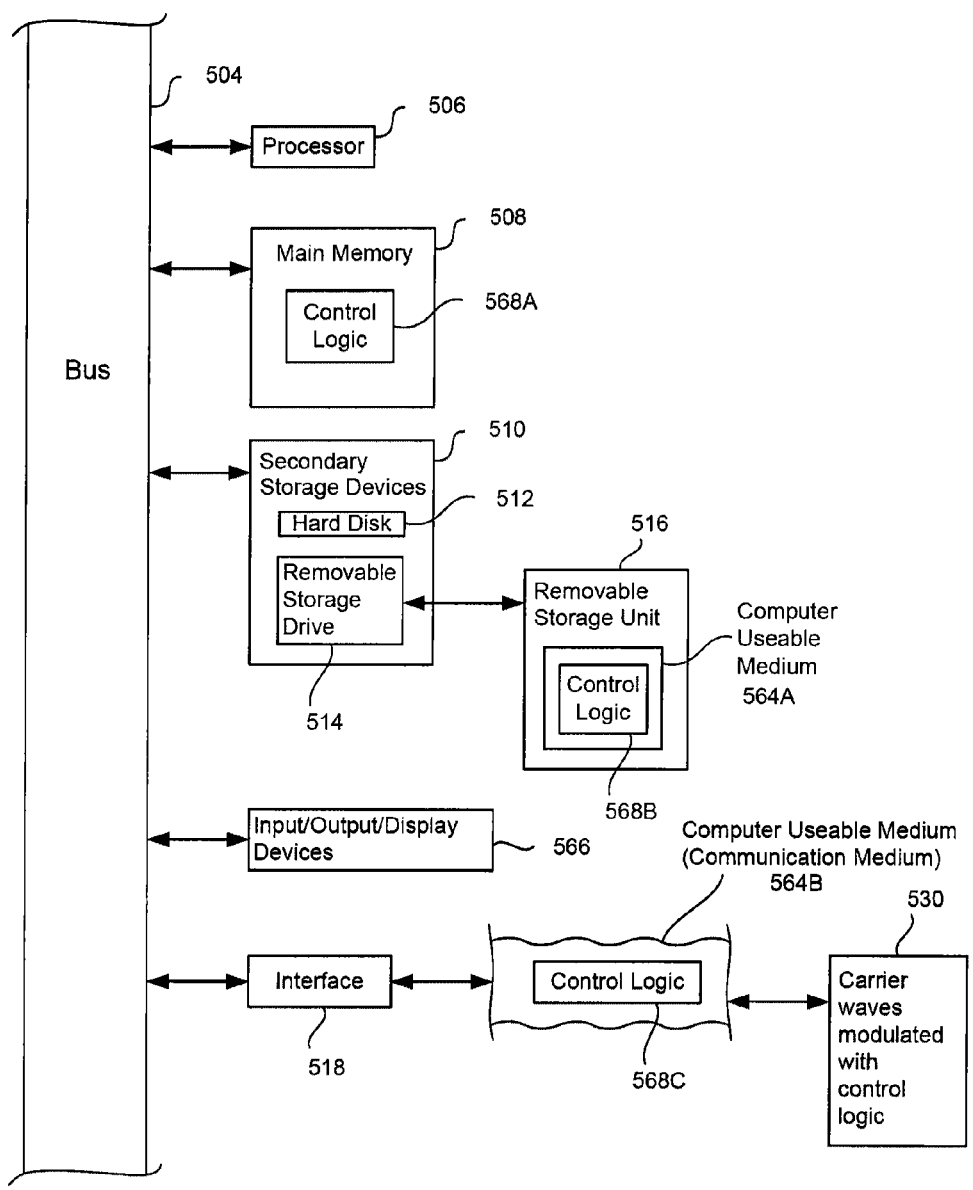
FIG. 5 depicts an example computer system in which embodiments of the present invention may be implemented.

In an embodiment of the present invention, the system and components of embodiments described herein are implemented using well known computers, such as computer 502 shown in FIG. 5. For example, server 120 or client device 110 can be implemented using computer(s) 502.

The computer 502 can be any commercially available and well known computer capable of performing the functions described herein, such as computers available from International Business Machines, Apple, Sun, HP, Dell, Compaq, Digital, Cray, etc.

The computer 502 includes one or more processors (also called central processing units, or CPUs), such as a processor 506. The processor 506 is connected to a communication bus 504.

The computer 502 also includes a main or primary memory 508, such as random access memory (RAM). The primary memory 508 has stored therein control logic 528A (computer software), and data.

The computer 502 also includes one or more secondary storage devices 510. The secondary storage devices 510 include, for example, a hard disk drive 512 and/or a removable storage device or drive 514, as well as other types of storage devices, such as memory cards and memory sticks. The removable storage drive 514 represents a floppy disk drive, a magnetic tape drive, a compact disk drive, an optical storage device, tape backup, etc.

The removable storage drive 514 interacts with a removable storage unit 516. The removable storage unit 516 includes a computer useable or readable storage medium 524 having stored therein computer software 528B (control logic) and/or data. Removable storage unit 516 represents a floppy disk, magnetic tape, compact disk, DVD, optical storage disk, or any other computer data storage device. The removable storage drive 514 reads from and/or writes to the removable storage unit 516 in a well known manner.

The computer 502 also includes input/output/display devices 522, such as monitors, keyboards, pointing devices, etc.

The computer 502 further includes a communication or network interface 518. The network interface 518 enables the computer 502 to communicate with remote devices. For example, the network interface 518 allows the computer 502 to communicate over communication networks or mediums 524B (representing a form of a computer useable or readable medium), such as LANs, WANs, the Internet, etc. The network interface 518 may interface with remote sites or networks via wired or wireless connections.

Control logic 528C may be transmitted to and from the computer 502 via the communication medium 524B. More particularly, the computer 502 may receive and transmit carrier waves (electromagnetic signals) modulated with control logic 530 via the communication medium 524B.

Any apparatus or manufacture comprising a computer useable or readable medium having control logic (software) stored therein is referred to herein as a computer program product or program storage device. This includes, but is not limited to, the computer 502, the main memory 508, secondary storage devices 510, the removable storage unit 516 and the carrier waves modulated with control logic 530. Such computer program products, having control logic stored therein that, when executed by one or more data processing devices, cause such data processing devices to operate as described herein, represent embodiments of the invention.

The invention can work with software, hardware, and/or operating system implementations other than those described herein. Any software, hardware, and operating system implementations suitable for performing the functions described herein can be used.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method, comprising:

receiving, by a computing device, a first table and a second table from a first database;

augmenting, by the computing device, the first table by adding a first synchronization key, wherein the first synchronization key identifies a first row in the first table;

augmenting, by the computing device, the second table by adding a second synchronization key, wherein the second synchronization key identifies a second row in the second table;

recording, by the computing device, a relationship between the first synchronization key and the second synchronization key, wherein the relationship is established by a common identifier in the first and second tables;

recording, by the computing device, a timestamp for the first synchronization key, wherein the timestamp indicates an access to the first row; and synchronization the first database with a second database by performing a comparison of the first synchronization key and the timestamp with an additional synchronization key and an additional timestamp for the additional synchronization key, wherein the additional synchronization key and the additional timestamp for the additional synchronization key are from the second database, whereby the first row identified by the first synchronization key is synchronized due to the comparison and the second row identified by the second synchronization key is synchronized based on the relationship between the first synchronization key and the second synchronization key.

2. A system, comprising:

a memory; and a processing device coupled to the memory and configured to:

receive a first table and a second table from a first database;

augment the first table by adding a first synchronization key, wherein the first synchronization key identifies a first row in the first table;

augment the second table by adding a second synchronization key, wherein the second synchronization key identifies a second row in the second table;

record a relationship between the first synchronization key and the second synchronization key, wherein the relationship is established by a common identifier in the first and second tables;

record a timestamp for the first synchronization key, wherein the timestamp indicates an access to the first row; and synchronize the first database with a second database by performing a comparison of the first synchronization key and the timestamp with an additional synchronization key and an additional timestamp for the additional synchronization key, wherein the additional synchronization key and the additional timestamp for the additional synchronization key are from the second database, whereby the first row identified by the first synchronization key is synchronized due to the comparison and the second row identified by the second synchronization key is synchronized based on the relationship between the first synchronization key and the second synchronization key.

3. An article of manufacture including a computer-readable medium having instructions stored thereon that, if executed by a computing device, cause said computing device to perform operations comprising:

receiving, by a computing device, a first table and a second table from a first database;

augmenting the first table by adding a first synchronization key, wherein the first synchronization key identifies a first row in the first table;

augmenting the second table b adding a second synchronization key, wherein the second synchronization key identifies a second row in the second table;

recording a relationship between the first synchronization key and the second synchronization key, wherein the relationship is indicated by a common identifier in the first and second tables;

recording a timestamp for the first synchronization key, wherein the timestamp indicates an access to the first row; and synchronizing a the first database with a second database by performing a comparison of the first synchronization key and the timestamp with an additional synchronization key and an additional timestamp for the additional synchronization key, wherein the additional synchronization key and the additional timestamp for the additional synchronization key are from the second database, whereby the first row identified by the first synchronization key is synchronized due to the comparison and the second row identified by the second synchronization key is synchronized based on the relationship between the first synchronization key and the second synchronization key.

4. The method of claim 1, further comprising:

assigning an identifier to the first synchronization key.

5. The method of claim 1, further comprising:

maintaining the relationship between the first and the second synchronization keys, wherein the relationship links the first row with the second row, wherein the first and second rows represent a subset of the first and second tables.

6. The method of claim 1, further comprising:

synchronizing the first and second synchronization keys with a client.

7. The method of claim 1, further comprising:

receiving a request for the first row;

identifying, in response to the request, the first synchronization key;

identifying the second synchronization key based on the recorded relationship, and identifying the second row from the second synchronization key; and transmitting said first and second rows to a client.

8. The system of claim 2, wherein said server is further configured to assign an identifier to the first synchronization key.

9. The system of claim 2, wherein said server is further configured to maintain the relationship between the first and the second synchronization keys, wherein the relationship links the first row with the second row, wherein the first and second rows represent a subset of the first and second tables.

10. The system of claim 2, wherein said server is further configured to synchronize the first and second synchronization keys with a client, wherein the first and second synchronization keys identify the first and second rows, respectively, representing a subset of the first and second tables.

11. The system of claim 2, wherein said server is further configured to:

receive a request for the first row;

identify, in response to the request, the first synchronization key;

identify the second synchronization key based on the recorded relationship, and identify the second row from the second synchronization key; and transmit said first and second rows to a client.

12. The system of claim 2, wherein said server is further configured to transmit a subset of the first and second tables.

13. The article of manufacture of claim 3, said operations further comprising:
  assigning an identifier to the first synchronization key.

14. The article of manufacture of claim 3, said operations further comprising:
  maintaining the relationship between the first and the second synchronization keys, wherein the relationship links the first row with the second row, wherein the first and second rows represent a subset of the first and second tables.

15. The article of manufacture of claim 3, said operations further comprising:
  synchronizing the first and second synchronization keys with a client, wherein the first and second synchronization keys identify the first and second rows, respectively, representing a subset of the first and second tables.

16. The article of manufacture of claim 3, said operations further comprising:
  receiving a request for the first row;
  identifying, in response to the request, the first synchronization key;
  identifying, the second synchronization key based on the recorded relationship, and identifying the second row from the second synchronization key; and
  transmitting said first and second rows to a client.

17. The method of claim 4, further comprising:
  synchronizing the first synchronization key by comparing the first identifier and the timestamp with an additional identifier assigned to the additional synchronization key and the additional timestamp, wherein a difference in the timestamp and the additional timestamp indicates a need for synchronization.

18. The method of claim 7, wherein said transmitting comprises:
  transmitting a subset of the first and second tables.

19. The system of claim 8, wherein said server is further configured to synchronize the first synchronization key by comparing the first identifier and the timestamp with an additional identifier assigned to the additional synchronization key and the additional timestamp, wherein a difference in the timestamp and the additional timestamp indicates a need for synchronization.

20. The article of manufacture of claim 13, said operations further comprising:
  synchronizing the first synchronization key by comparing the first identifier and the timestamp with an additional identifier assigned to the additional synchronization key and the additional timestamp, wherein a difference in the timestamp and the additional timestamp indicates a need for synchronization.

\* \* \* \* \*